Oct. 17, 1933.　　　　　J. L. ANDERSON　　　　　1,930,847

METHOD AND APPARATUS FOR WELDING

Filed April 1, 1931

INVENTOR
BY James L. Anderson
ATTORNEY

UNITED STATES PATENT OFFICE 1,930,847

METHOD AND APPARATUS FOR WELDING

James L. Anderson, Tenafly, N. J., assignor to Air Reduction Company, Incorporated, New York, N. Y., a corporation of New York Application April 1, 1931. Serial No. 527,033

14 Claims. (Cl. 113—59)

This invention relates to a method of welding and to apparatus therefor.

In the operations of butt or lap welding plate metal, either as disposed in its original flat condition, or after it has been twisted or bent into tubular form, high temperatures are employed to fuse together the adjacent or contacting portions.

Among other devices for creating such high temperatures, oxy-fuel gas devices, such as oxyacetylene welding torches, either with a single flame jet or with a plurality of jets, have been used. Where the welding operation is to be carried forward continuously and mechanically as a quantity production operation, the single flame jet torch is, of course, useless, and welding with only a single line of jets playing on or between the seam edges has very definite limitations in respect to the speed of welding, utilization of the heat of the gases and quality of the weld.

In order to insure the speed, economy and effectiveness of oxyacetylene welding when applied to such operations I have heretofore devised a method and torch tips (Patents Nos. 1,402,996, 1,402,997 and 1,516,486) for welding with two more or less parallel rows of flame jets, or an equivalent arrangement, so that the metal of and adjacent to the seam edges was heated and fused by the intense heat between the rows or between the confines of the jet arrangement. Impingement of part or all of the jets on solid metal back of the extreme edges was contemplated, but in the execution of the plan such jets were nevertheless near the edges.

The present invention includes the subject-matter of the aforesaid patents, while differing therefrom in a manner which makes possible a remarkable increase in linear speed of welding with good penetration, together with definitely increased efficiency in the utilization of the heat developed by the burning of the gases and greater facility in producing welds which are both strong and of good appearance.

In prior practice heat has been conducted through the metal away from the edges to be fused, these edges being heated to a very high temperature while the bulk of the metal remained at a very much lower temperature. As one consequence of this, there has been a fairly sharp line of demarkation between parent metal and fused metal. At the surface this is often evidenced by sharp corners, grooves or ridges lacking in strengthening fillets.

In the process of welding described herein, the heating of the metal is commenced at a distance much removed from the edges of the portions to be welded together. Upon such initiation of heat, conduction through the metal occurs in all directions, but it will be sufficient to consider two directions only, namely, toward the seam edges and away from the seam edges. By this application of heat, a hot outpost area is created in the metal to be welded between the seam margins and the bulk of the tube or plate metal. The application of heat is then, in effect, moved in a calculated manner toward the seam edges, and is finally brought close to, over or between the seam edges as they fuse together. As the direct application of heat moves toward the seam edges, the metal between the initially heated portions and the edges increases in temperature, as the heat directly applied to each portion is added to that previously conducted thereto.

Also, while heat continues to be conducted to the relatively cool regions away from which the application of heat is being displaced, still, due to the heat previously applied at these portions, walls of hot metal are created which render impossible any large difference in temperature between fusing metal and nearby solid metal. This effectively reduces conduction away from the highly heated area of fusing metal, thereby promoting penetration, and eliminates the usual demarkation between parent metal and the metal of the completed weld. On the contrary, because of the advantageous temperature gradient which is maintained, both the internal structure across the weld into the parent metal, as well as the external formation are much improved over results formerly obtained.

It is a further object to provide apparatus for carrying out the method above set forth including a torch tip from which are emitted a plurality of flame jets in such manner that the fuel gases will be burned completely more quickly and economically, and closer to the point of application of the jets to the metal, the heat generated will be absorbed more completely by the metal to be fused, and a weld merging smoothly and gradually into the parent metal will be produced, all while greater speed of movement of the tip relative to the metal is attainable.

While the advantages of the invention are by no means limited to the thickness of the material to be welded, they are of great importance in operations on metal of considerable thickness, in which the completion of penetration is ordinarily relatively slow.

In the ordinary welding operation, in which the flame jets are applied at, or quite near, the seam edges, the effort to raise the metal of the seam edges to a fusing temperature is at all times counteracted by conduction through the metal between two regions, the temperatures of which are at two extremes, namely, the very hot edges and the comparatively cold metallic body. Conduction is largely away from the seam edges. By the method now set forth, conduction toward the seam edges is an important factor. At the period of fusion, conduction away from the seam edges is meagre, as two temperature areas of approximately the same value have been created, namely, the fused edges and highly heated metal guarding the edges.

In the drawing illustrating certain preferred forms of the invention:

Figure 1:
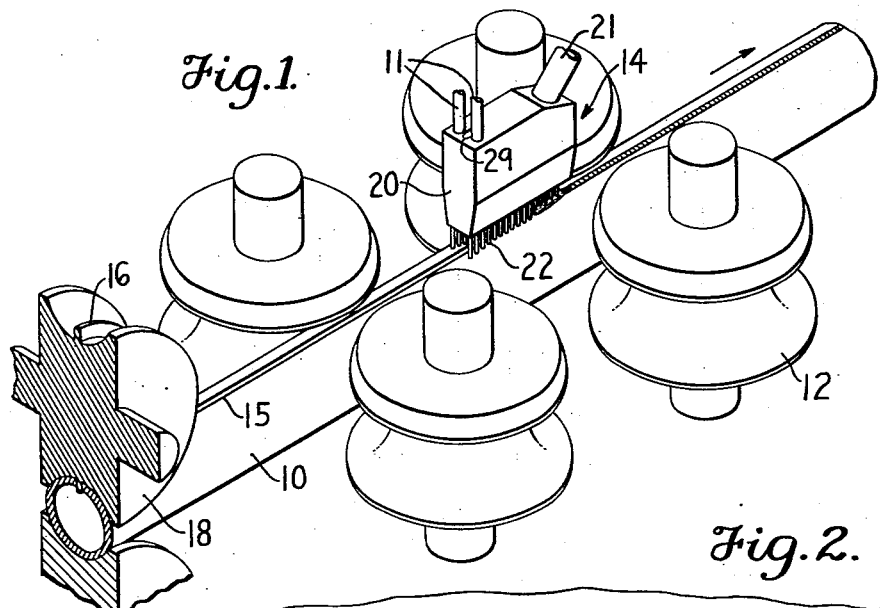
Fig. 1 is a perspective view, illustrating an application of the invention herein to the welding of seams in pipe. The view is schematic and the parts are not to be understood as being in proportion.

The invention is illustrated as applied to the manufacture of tubing by fusing together the seam edges of a bent metallic sheet or plate, but it will be understood that the invention is not limited to tube welding. In Fig. 1, an open-seam tube section 10 is being fed by means of a set of rolls 12 past a torch 14. Rolls 12, because of their location with respect to the consummation of the welding operation, have become known as the "welding rolls". The tube is being guided by the engagement within the open seam 15 of a fin 16 at the center of a roller 18.

The torch has a tip block 20 to which the oxyacetylene mixture is supplied through a stem 21. The remainder of the torch, including the provisions for proportioning the oxygen and acetylene and for bringing them together, are not shown since these may be of any standard or suitable design. The torch is, of course, supported in a stable manner. At 29 is shown the entrance of a wire feed passage which, if used, preferably extends downward and rearward through the tip block, the exit of such a passage being indicated at 39 in Figs. 2, 3 and 4. Water cooling connections 11 are indicated. The interior of the tip block is drilled or otherwise formed with passages for circulation of the cooling fluid and with passages for distributing the gas mixture to the numerous flame jets, which are delivered from the under face of the tip through small perpendicular bores drilled to intersect the distributing passages. Such matters are familiar to those skilled in the art and it will be sufficient to illustrate examples of the disposition of the jets in Figs. 2-4 to illustrate the invention in the tip and in the improved method of welding.

The flame jets 22 heat the metal of the edges of the seam progressively to fusing temperature while the welding rolls 12 feed the tube section past the jets.

Figure 2:
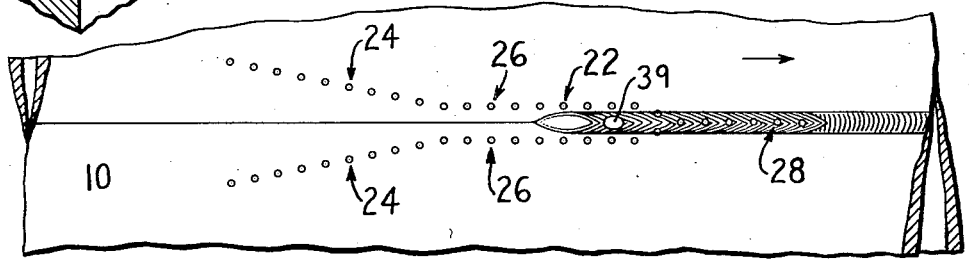
Fig. 2 is a plan view on a larger scale, in which but a portion of the pipe is shown, and the relation of jets, wire-feed and seam is shown.

In the form shown in Fig. 2, the flame jets are arranged in two converging rows 24, ending in two parallel rows 26, which are succeeded by a single central row 28. The rows of jets 24 diverge so widely from the rear to their foremost and outermost jets that part at least of the jets of this group are spaced far away from the edges of seam 15 and much outside the zone of fusion eventually to be produced. The jets of the rows 26 are close to the seam edges, and between these rows, toward the rear, the metal is brought to fusion, creating an elongated puddle of molten metal, from which, with or without the addition of metal, the weld is formed. The single row jets 28 aid in completing the fusion and in determining the final contour of the weld.

As the tube section 10 and torch 14 move relatively, each transverse section of the metal is successively subjected to sets of flame jets which act on metal that is never fused and which, from this distant spacing, approach more closely to the seam. The first set of jets which were spaced at the greatest distance from the seam will have raised the temperature of the metal at those regions. Each succeeding set of jets adds additional heat to metal already heated, but the amount of conduction away from the seam edges will be progressively reduced, since each succeeding jet operates behind the barrier of hot metal set up by the preceding jet. Conduction to the seam edges will be progressively increased because the heat sources continue to come closer to them than to the cold regions, from which the seam region is effectively protected by the hot wall. Finally, the parallel rows 26 become operative to fuse the metal of the edges together.

The number of flames in the rows 26 will be determined by the speed of relative travel of section 10 and tip 20, and also by the number of jets in the diverging rows 24 and the specific angle of divergence of such rows. The fused metal may be retained in molten condition for a predetermined period of time by means of the single row 28, the purpose of these jets being to cause the metal to commingle more uniformly and also to permit the metal to run into a more uniform and smoother weld.

Additional metal may be added from a wire or rod fed through the passage 29. This will depend upon the amount of reinforcement desired, if any, and on whether the seam edges are formed or arranged to include a trough, as in welding thick metal. The point where the welding rod, or metal therefrom, may be fed into the molten metal of the weld being produced, is indicated at 39.

Figure 3:
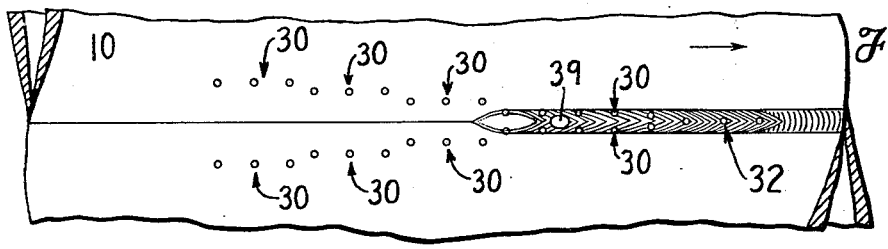
Figs. 3 and 4 are views similar to Fig. 2 illustrating modified arrangements of the jets in relation to the seam.

In Fig. 3, the orifices are disposed in parallel rows 30, not overlapping, the first pair of rows being spaced most widely from the seam, and succeeding rows being nearer and nearer to the seam, until the jets of the last pair of rows play substantially on the edges and on the borders of the molten puddle. A final single row 32, similar to the row 28 of Fig. 2, is also preferably employed. With an arrangement of this character substantially the same effect of convergence of the direct heating from regions at first comparatively remote from the seam edges to regions adjacent the edges is produced as in Fig. 2. This particular plan can be amplified for especially high speeds of welding. Thus, for example, each of the jets of the converging rows 24 of Fig. 2 may be conceived of as being replaced by two or more jets disposed in straight longitudinal lines, in order to give a longer effective time for putting heat into the metal at each successively smaller distance from the seam.

The jet orifices, in all the modifications, may be single circular openings, or may be slits; the rows may be made up of a plurality of aligned openings or slits, or may be single slits of predetermined lengths. Transverse slits may also be used as orifices, if desired. Preferably, however, the orifices are of the circular type.

Figure 4:
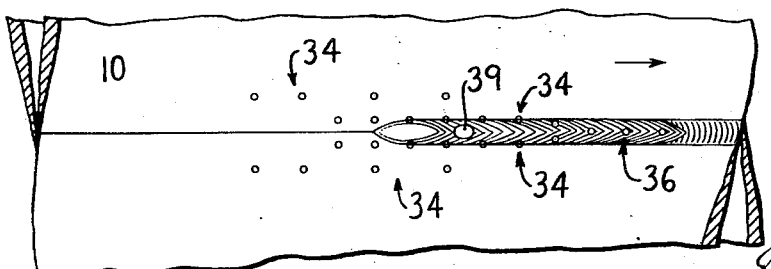

In Fig. 4, parallel rows 34 of jets are seen to overlap as they converge or draw in toward the final single row 36. This arrangement has advantages for working on particularly thick metal, in order to obtain very high temperatures in very short time, and further to reduce the amount of conduction away from the seam to be heated. In this case, also, the hot wall is maintained by flame jets auxiliary to those operating substantially upon or between the seam margins, so that the latter not only are enabled to direct their entire heat to this end, but also are assisted by heat conducted to the seam margins by such auxiliary jets. As a matter of illustration this view shows only two rows of jets at each side of the center line, but of course there may be additional rows to extend the heating ahead or farther away from the seam. In general, as many jets and as many rows or groups of jets may be provided as requirements may dictate.

An important advantage resulting from the wide spacing of the flame jets at opposite sides of the seam, at the front end of the organization, and the gradual drawing in of the jets toward the seam or center line, is that the atmospheric oxygen has ready access to the hydrogen and carbon monoxid envelope gases of the flame jets. In effect a broad entrance is provided for air for this secondary combustion. These envelope gases have much calorific value, which ordinarily is not made use of in a really effective manner. Prompt burning of the envelope gases in the immediate vicinity of the high temperature flame cones is a desideratum both for the useful additional heat thus made available and for the good functioning of the cones themselves. While the cones represent the burning of carbon to carbon monoxid in the oxygen of the pre-formed mixture, this reaction can not continue if atmospheric oxygen for the secondary reaction is lacking. For this reason, it is common for the jets of multi-jet torches to be more or less enfeebled, and sometimes one or more jets will cease altogether. For high speed or heavy welding operations, in which large volumes of gases are to be consumed, it is especially important, for success and economy, that the envelope gases be burned as effectively as possible.

Many other changes could be made in the particular apparatus designed, and in the methods set forth, without substantially departing from the invention, the specific description being merely to illustrate operative modes of carrying the invention into effect.

I claim:

1. The method of progressively heating and fusion welding a seam by means of a multiplicity of oxy-fuel gas flame jets while the work and the jets are in continuous relative motion, characterized in that direct heating of the metal by such jets, from regions much removed from the seam edges and well outside of the zone of fusion to be produced, is caused to converge upon the seam.

2. The method of progressively heating and fusion welding a seam by means of a multiplicity of oxy-fuel gas flame jets while the work and the jets are in continuous relative motion, characterized in that direct heating of the metal by such jets, from regions much removed from the seam edges and well outside of the zone of fusion to be produced, is caused to converge upon the seam, the fused metal being finally acted on by jets disposed substantially in the center line.

3. The method of progressively heating and fusion welding a seam by means of a multiplicity of oxy-fuel gas flame jets while the work and the jets are in continuous relative motion, characterized in that the heating and fusing of the metal is accomplished with an organization of jets which at the front are spaced wide apart at opposite sides of the seam to play upon portions of the metal not to be fused, the direct heating being brought closer to the seam through a succession of jets, and the heating and fusing of the edges being effected by series of jets closely paralleling the seam.

4. The method of progressively heating and fusion welding a seam by means of a multiplicity of oxy-fuel gas flame jets while the work and the jets are in continuous relative motion, characterized in that the heating and fusing of the metal is accomplished with an organization of jets which at the front are spaced wide part at opposite sides of the seam so as to impinge on metal away from the seam strip zone which is to be fused, the direct heating being brought closer to the seam through a succession of jets, the heating and fusing of the edges being effected by series of jets closely paralleling the seam, and a final working being effected by seam jets disposed in series substantially centrally of the fused seam.

5. The method of progressively heating and fusion welding a seam as set forth in claim 1, wherein part or all of the jets are arranged in parallel rows which are disposed progressively nearer the center.

6. The method of progressively heating and fusion welding a seam as set forth in claim 1, wherein part or all of the jets are arranged in parallel rows which are disposed progressively nearer the center, said rows being non-overlapping.

7. The method of progressively heating and fusion welding a seam as set forth in claim 1, wherein part or all of the jets are arranged in parallel rows which are disposed progressively nearer the center, said rows being in overlapping relation.

8. A multi-jet oxyacetylene welding tip of the kind described provided with orifices so disposed as to deliver an organization of heating and welding jets which are widely spaced in the transverse direction at the forward end of the tip to play upon portions of the metal not to be fused and converge toward the center line.

9. A multi-jet oxyacetylene welding tip of the kind described provided with orifices so disposed as to deliver an organization of heating and welding jets which are widely spaced in the transverse direction at the forward end of the tip so as to impinge on metal away from the seam strip zone which is to be fused and converge toward the center line, a converging series of jet orifices being succeeded by a series of orifices extending in the longitudinal direction.

10. A multi-jet oxyacetylene welding tip of the kind described provided with orifices so disposed as to deliver an organization of heating and welding jets which are widely spaced in the transverse direction at the forward end of the tip and converge toward the center line, a converging series of jet orifices being succeeded by substantially parallel rows of jets relatively near the center line.

11. A multi-jet oxyacetylene welding tip of the kind described provided with orifices so disposed as to deliver an organization of heating and welding jets which are widely spaced in the transverse direction at the forward end of the tip and converge toward the center line, a converging series of jet orifices being succeeded by substantially parallel rows of jets relatively near the center line, and these in turn by jets disposed in the center line.

12. A process of fusion welding seams by high temperature flame jets, which comprises putting heat into the metal at distances considerably removed from the seam and out of the eventual fusion zone, then highly heating the metal members at a short distance away from the seam and at the borders of the fusion zone to fuse the edges of the seam together, and then directly heating the fused metal centrally of the seam.

13. The method of progressively heating and fusion welding a seam as set forth in claim 1, wherein part or all of the jets are arranged in a plurality of parallel rows which are disposed progressively nearer the center, the first parallel rows being spaced wide apart on both sides of the seam so as to put heat into the metal outside of the zone of eventual fusion, and the latter rows being spaced so close as to be in the zone of fusion.

14. In a process of fusion welding seams between metal bodies, the step of highly heating, by flame jets, outlying regions of the metal body not to be fused, so as to minimize transfer of heat away from the seam when it is then fused.

JAMES L. ANDERSON.